United States Patent [19]  
LaFlame

[11] 4,310,085  
[45] Jan. 12, 1982

[54] ELECTRO-VISCOUS FAN CLUTCH
[75] Inventor: Frank E. LaFlame, Dayton, Ohio
[73] Assignee: General Motors Corporation, Detroit, Mich.
[21] Appl. No.: 73,006
[22] Filed: Sep. 6, 1979
[51] Int. Cl.³ .................... F16D 35/00; F16D 43/25
[52] U.S. Cl. ................................ 192/58 B; 192/82 T
[58] Field of Search ......................... 192/58 B, 82 T
[56] References Cited
U.S. PATENT DOCUMENTS 3,559,785  2/1971  Weir ................................ 192/58 B
3,840,101 10/1974  Peter et al. ...................... 192/58 B
3,983,980 10/1976  Weintz ............................ 192/58B
4,036,339  7/1977  Kikuchi .......................... 192/58 B
4,056,178 11/1977  Detty .......................... 192/82 T X
4,060,158 11/1977  Kikuchi ...................... 192/58 B X Primary Examiner—Allan D. Herrmann  
Attorney, Agent, or Firm—Charles R. White

[57] ABSTRACT

Viscous magnetic clutch for a radiator cooling fan which is electrically energized on closure of thermoswitch mounted within coolant of engine radiator. The clutch plate serves as a fluid pump to feed the viscous sheer area of the clutch so that conventional pump plate construction is eliminated. A drain hole within the clutch plate is controlled by magnetically operated valve mechanism on thermoswitch signal to provide for the retention or exhaust of fluid from the sheer area to provide for the selective hydraulic clutching or declutching of the fan and the drive.

3 Claims, 4 Drawing Figures

U.S. Patent    Jan. 12, 1982    4,310,085
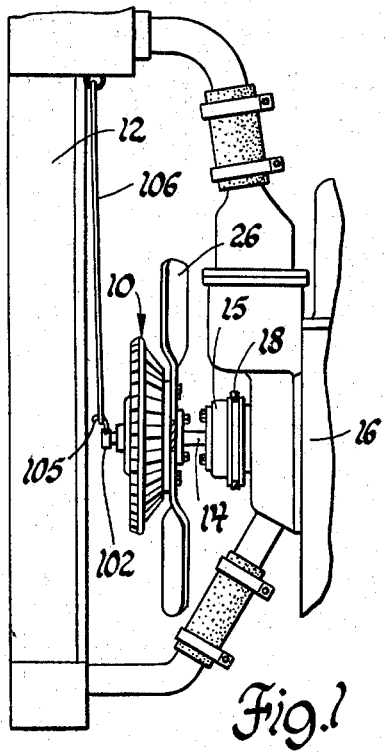
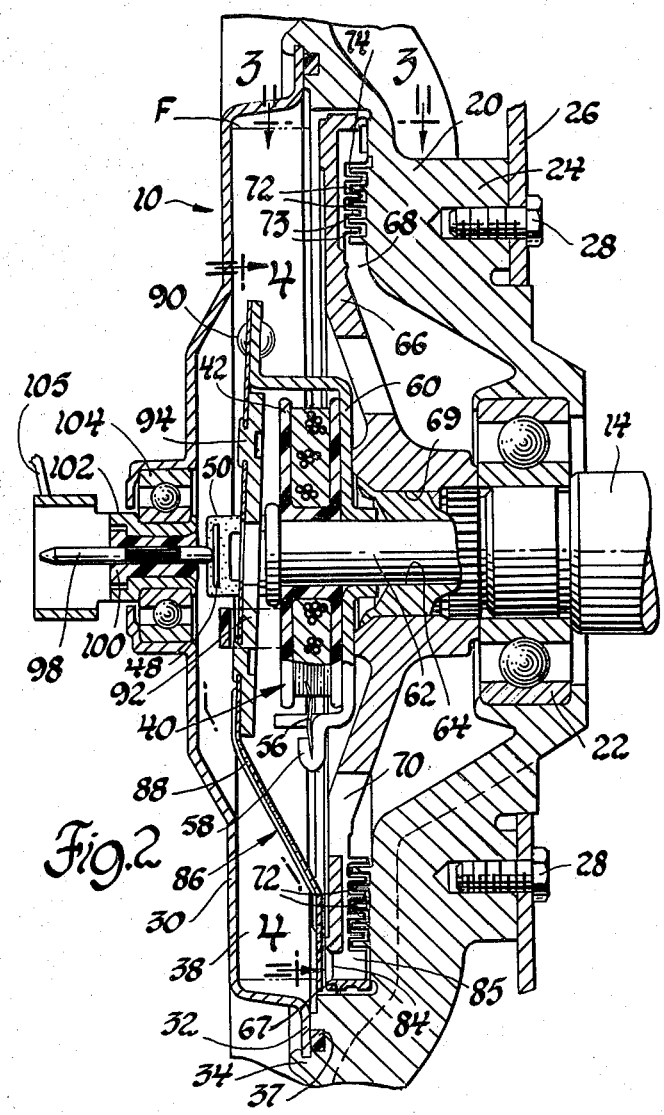
Fig.1
Fig.2
Fig.3
Fig.4

ELECTRO-VISCOUS FAN CLUTCH

This invention relates to clutches and more particularly to a new and improved electro-viscous fan clutch having a powered clutch plate for pumping fluid into a shear zone and having magnetic means controlling viscous clutching by controlling the exhaust of fluid from the shear zone through an opening in the clutch plate.

Prior to the present invention, many different fan constructions have been employed to induce or increase the flow of cooling air through an automotive radiator to reduce the temperature of the coolant circulated therein. To improve engine efficiency, many fan constructions employ clutches which engage for fan drive when the engine coolant temperature is above a predetermined temperature and which disengage when below that temperature. Among the various clutches used in such fans are viscous clutches which provide slippage for the gradual and progressive angular acceleration of the fan which permits the use of conventional fan blading. Magnetic clutches are also employed but more expensive and complex fans with flex blading are required for reduced noise in view of minimal clutch slippage on clutch engagement. Generally when the electromagnetic coil of such a clutch is energized, the fan is instantaneously brought up to speed without slippage so that flexible blading must be utilized for effective noise reduction.

In the preferred embodiment of this invention, a fan drive shaft that is shown as an extension of an engine driven water pump shaft has a fan body rotatably mounted thereon which encases a housing for the coil of an eletromagnetic-viscous clutch. This housing is supported for rotation of the fan drive shaft and has an internal viscous clutch surface which cooperates with a fluid pumping clutch plate secured to the fan drive shaft to provide a viscous shear area for the fluid drive of the housing and the fan blades attached thereto. Also mounted on the drive shaft is the electromagnetic device which is energized by a temperature control device external of the clutch which preferably is directly sensitive of temperature change occuring within the coolant circulated through the radiator. On energization the electromagnetic device effects the closure of an exhaust port formed in the clutch plate so that the viscous fluid will be sheared for the hydraulic drive of the fan blading. With this construction conventional pump plate construction is eliminated and effective utilization is made of the clutch plate as a fluid pump. In the event of reduction in temperature of the coolant, the electromagnetic device is de-energized allowing the flow of viscous fluid through the sheer area for fan declutching to thereby reduce the load on the vehicle power plant or any motor driving the fan.

It is a feature, object and advantage of this invention to provide a new and improved fan construction with an electrically controlled viscous clutch for a vehicle engine cooling fan with conventional fan blading to draw air through an adjacent engine cooling radiator in which a clutching plate pumps fluid into the shear area and which has an exhaust controlling the hydraulic drive through the clutch.

Another feature, object and advantage of this invention is to provide an electromagnetic viscous fan clutch for a vehicle radiator cooling fan with substantially rigid fan blades which features low disengaged RPM and viscous slip in the engaged mode to reduce fan noises.

Another feature, object and advantage of this invention is to provide a new and improved electrically controlled viscous fan clutch which can be used with rigid metallic fan blading as well as flexible blades and in which there is improved clutch control by direct use of radiator coolant temperature in lieu of air temperature from the radiator.

Another feature, object and advantage of this invention is to provide a new and improved electrically controlled viscous fan clutch which provides the advantages of electromagnetic clutches with quick engagement and disengagement features and with the advantage of viscous clutching allowing fan blade to progressively slip into speed and advantageously utilizing the viscous clutch as a pump member within the unit.

These and other features, objects and advantages of this invention will become more apparent from the detailed description and drawing in which::

FIG. 1 is a side elevational view of a radiator and engine having a viscous magnetic fluid clutch and associated cooling fan;

FIG. 2 is an enlarged fragmentary cross-sectional view of the viscous magnetic fluid clutch of FIG. 1 embodying this invention;

FIG. 3 is a top plan view taken along lines 3—3 of FIG. 2 as viewed in the direction of the indicator arrows; and FIG. 4 is an end view of the valve mechanism of this invention taken along lines 4—4 of FIG. 2 as viewed in the direction of the indicator arrows.

Turning now in greater detail to the drawing, there is shown in FIG. 1 a multibladed fan and clutch assembly 10 for drawing cooling air through the core of a vehicle radiator 12 through which engine cooling fluid is circulated. This assembly 10 is mounted on the outboard end of a rotatably driven shaft 14 whose inner end terminates in a flange secured to a water pump pulley 15. The pulley 15 and shaft 14 attached thereto are rotatably driven by vehicle engine 16 through a drive belt 18. The fan and clutch assembly comprises an annular dish-like main body 20 centrally mounted for rotation on shaft 14 by bearing 22. The main body 20 is formed with a plurality of radially extending bosses 24 to which a bladed fan 26 preferably of rigid material is attached by threaded fasteners 28. A cover 30 is mounted to the front of the main body 20 and cooperates therewith to house components of the electromagnetic-viscous clutch of this invention employed to drivingly connect and disconnect the fan with respect to the shaft 14.

As shown, the cover 30 is a thin wall dished member which has a radial flange 32 peripherally secured to the main body the annular upset or spun over portion 34 of the main body 20. Annular seal 37 interposed between the radial flange and the front face of the body prevents fluid leakage outwardly therefrom. The main body and cover cooperate to form a chamber 38 for a viscous clutching fluid F and for housing a coil assembly 40 mounted for rotation with the shaft 14.

The coil assembly 40 comprises an electrically insulating spool or bobbin 42 of plastic material that receives a number of turns of electrically conductive wire having one end provided by a lead 44 resistant welded at 46 to the outboard end of a flat electrical contact 48 supported by a plastic bracket 50 that extends outwardly from the front face of the bobbin. The contact 48 has a leaf spring finger 52 lanced therefrom which is adapted to engage an opening 54 formed in the upper surface of the bracket 50 to provide a detent so that the contact 48 may be secured in a predetermined position with respect to the bobbin.

The other end of the wire coil terminates in a ground lead 56 which is secured to a tab 58 of a metallic support frame 60 that cradles the coil assembly 40 as best shown in FIG. 2. The coil assembly 40 is pressed onto a cylindrical steel core 62 which in turn is press fitted through the central hub portion of the bracket and into an axial end opening 64 formed in the drive shaft 14. With this construction, the core, bracket and coil assembly are rotatable with drive shaft 14.

Also mounted on drive shaft 14 is an annular viscous clutch plate 66 which extends radially to a peripheral edge terminated adjacent to the annular inner wall 67 of the associated opening 68 for the clutch plate formed in the housing 20. The clutch plate is preferably an aluminum casting having a central opening 69 press fitted on the drive shaft 14 so that the clutch plate is rotatably driven by the drive shaft. The clutch plate has a plurality of equal spaced openings 70 formed radially outwardly of the central opening 69 for circulation of the viscous fluid. The clutch plate is further formed with a plurality of annular ridges 72 concentric with central opening 68 which fit in the grooves between corresponding annular ridges 73 formed on the main body 20 to provide an annular fluid shear space 74. Fluid sheered in this space transmits input torque to provide for the hydraulic drive of the body 20 and fan blading 26 by the clutch plate 66 under conditions described below.

Importantly, this clutch plate has a pair of helical fluid pumping grooves 75 and 76 formed on the periphery thereof as shown in FIG. 3. Each of these grooves has an inlet such as inlet 78 associated with groove 75 and an outlet such as outlet 80 associated with groove 76 for pumping viscous fluid from the chamber 38 to the shear area of the clutch plate and body when the clutch plate is rotatably driven by the shaft 14. Viscous fluid is selectively exhausted from the shear area for declutching through a drain hole 84 formed adjacent to the outer periphery of the clutch plate and connected to the sheer space by radial groove 85 so that fluid can be rapidly exhausted from the shear space through hole 84 under declutching conditions.

The drain hole 84 is appropriately opened or closed by a valve element 86 formed by the flattened free end of a spring member 88 secured to the magnet frame 60 by rivets 90. Normally, this spring is sprung outwardly so that the drain hole is open to permit the passage of viscous fluid from the viscous shear area to the chamber 38.

The spring 88 carries a rectangular metallic contact bar 92 secured to the underside thereof by studs 94 which project through corresponding opening in the spring and which are peened over to trap the spring thereto as shown in FIG. 2. When the coil is energized, the contact bar will be magnetically attracted and moved into contact with the head of the core 62. The spring being fixed with the contact bar will be displaced therewith so that the valve element 86 formed by the free end of the spring blocks hole 84. Under these blocking conditions the viscous fluid is effectively held within the shear area of the fluid clutch for the hydraulic drive of the fan. When the coil is de-energized, the spring returns to the FIG. 2 position in which valve element 86 is moved away from the hole 84. Under these conditions the shear area exhausts into chamber 38 so that the hydraulic drive is terminated.

The electrical contact 48 is engaged by the end of a terminal 98 centrally supported in cover 30 by insulator 100, shouldered insert 102 and by bearing assembly 104. Element 105 is a restraining arm attached to the insert 102 and is connected by cable 106 to the radiator or other suitable support to prevent rotation of the insert.

A suitable heat sensitive switch such as disclosed in my prior application Ser. No. 12,156 filed Feb. 14, 1979 for Cooling Fan with Viscous Magnetic Fan Clutch, hereby incorporated by reference, is disposed within the fluid of the radiator. This thermoswitch is electrically connected with the terminal 98 so that the coil may be quickly energized or de-energized for fan drive engagement or disengagement in accordance with cooling requirements.

As indicated above when the coil is electrically energized, by the vehicle battery on the closing of a temperature sensitive switch immersed in the cooling fluid, the drain hole in the clutch plate will be closed. The grooves on the outer periphery of the rotation clutch plate continuously pump quantities of fluid into the shear area for the viscous drive of the housing 20 and the bladed fan 26. This provides for the progressive increase in fan speed to a maximum speed so that conventional economical fan blading may be employed with this invention. On opening of this switch, the drain hole will be opened by movement of the valve element and the spring arm from the hole to reduce the fluid in the shear area for the progressive disengagement of the fan clutch.

With fluid supplied to the shear area of the clutch by the helical grooves formed on the clutch plate, there is no need for a pump plate as in many prior art constructions. Also, with this construction there is no internal bimetal needed to prevent cold operation fan noises sometimes referred to as: "morning sickness". On starting of the engine after extensive shutdown, the engine coolant temperature is low so that the drain hole will remain open and there is no viscous clutching for drive of the fan blading. Thus, the noises normally produced by a cooling fan are sharply reduced with this invention and without use of bimetal valving.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A fan for inducing air flow through a radiator in which engine coolant is circulated comprising a shaft member adapted to be rotatably driven, first clutch means operatively connected to said driven shaft for rotation therewith, second rotatably mounted clutch means spaced from said first clutch means to form a fluid shear space therebetween for receiving a viscous fluid so that said second fluid clutch means can be hydraulically driven by said first clutch means when a predetermined supply of fluid is maintained in said shear space, fan blade means secured to said second clutch means and extending radially outwardly therefrom, a cover plate attached to second clutch means to form a reservoir for a predetermined quantity of viscous fluid, said first clutch means having fluid pumping means for pumping fluid into said shear space from said reservoir, exhaust passage means in said first clutch means for exhausting fluid from said shear space into said reservoir, and electromagnetic control means drivingly secured to said shaft member for rotation therewith and disposed between said cover plate and said first clutch means for selectively closing said exhaust passage means to effect the viscous drive of said fan blade in response to the rotatable drive of said first clutch means.

2. A fan for inducing the flow of air through a radiator in which engine coolant is circulated comprising a shaft member adapted to be rotatably driven, first clutch means operatively connected to said driven shaft member for rotation therewith, second rotatably mounted clutch means spaced from said first clutch means to form a fluid shear space therebetween for receiving a viscous clutch fluid so that said second fluid clutch means can be rotatably driven by said first clutch means when a predetermined quantity of fluid is maintained into said shear space, fan blade means secured to said second clutch means and extending radially outwardly therefrom, a cover plate attached to second clutch means to form a reservoir for a predetermined quantity of viscous clutch fluid, said first clutch plate means having fluid pumping means for pumping viscous clutch fluid into said shear space from said reservoir, exhaust passage means in said first clutch means for exhausting viscous clutch fluid from said shear space into said reservoir, and electrically operated control means disposed within said reservoir and drivingly secured to said shaft member for rotation therewith for selectively opening and closing said exhaust passage means in accordance with a temperature signal proportional to the temperature of engine coolant to increase the drive of said second clutch means by said first clutch means so that said fan blade means is rotatably driven to circulate cooling air through said radiator.

3. A fan for inducing the flow of air through a radiator in which engine coolant is circulated comprising a shaft member adapted to be rotatably driven, first clutch means operatively connected to said driven shaft for rotation therewith, second clutch means rotatably mounted on said shaft and spaced from said first clutch means to form a fluid shear space therebetween for receiving a viscous clutch fluid so that said second fluid clutch means can be hydraulically driven by said first clutch means when a predetermined supply of fluid is maintained into said shear space, fan blade operatively secured to said second clutch means and extending radially outwardly therefrom, a cover plate attached to second clutch means to form a reservoir for a predetermined quantity of clutch fluid, said first clutch plate means having pumping groove means on the periphery thereof for pumping fluid into said shear space from said reservoir, exhaust passage means in said first clutch means for exhausting fluid from said shear space into said reservoir, and electrically energized control means including a rotatable coil disposed within said reservoir drivingly connected to the end of said shaft member for rotation therewith and being operative for opening and closing said exhaust passage means in accordance with a predetermined temperature signal proportional to the temperature of said engine coolant to thereby increase the viscous drive of said first clutch means by said second clutch means so that said fan blading is rotatably driven to increase the flow of cooling air through said radiator.

* * * * *